United States Patent [19]
Green et al.

[11] Patent Number: 5,193,036
[45] Date of Patent: Mar. 9, 1993

[54] TRANSDUCER HEAD SKEW ARRANGEMENT FOR DISK DRIVE SYSTEM

[75] Inventors: Martin R. Green; Randolph B. Heineke; John J. Stephenson, all of Rochester, Minn.

[73] Assignee: International Business Machines Corporation, Armonk, N.Y.

[21] Appl. No.: 591,910

[22] Filed: Oct. 2, 1990

[51] Int. Cl.⁵ .................. G11B 5/596; G11B 5/584
[52] U.S. Cl. .................. 360/78.14; 360/77.05; 360/77.07; 360/77.11
[58] Field of Search ............ 360/78.14, 75, 77.04, 360/77.05, 77.07, 77.11, 78.04, 72.1, 72.2, 98.01; 395/425

[56] References Cited

U.S. PATENT DOCUMENTS

| | | | |
|---|---|---|---|
| 3,838,457 | 9/1974 | Palmer | 360/78 |
| 4,371,960 | 2/1983 | Kroiss | 369/43 |
| 4,638,384 | 1/1987 | Stewart et al. | 360/77.05 |
| 4,807,063 | 2/1989 | Moteki | 360/78.04 |
| 4,809,120 | 2/1989 | Ozawa | 360/77.08 |
| 5,012,363 | 4/1991 | Mine et al. | 360/77.11 |
| 5,105,378 | 4/1992 | Tsuneta et al. | 360/77.04 |
| 5,109,306 | 4/1992 | Mase et al. | 360/77.04 |

FOREIGN PATENT DOCUMENTS

| | | |
|---|---|---|
| 0233606 | 8/1987 | European Pat. Off. . |
| 0267771 | 5/1988 | European Pat. Off. . |
| 0319803 | 6/1989 | European Pat. Off. . |
| 2629473 | 5/1978 | Fed. Rep. of Germany . |
| 58-1812 | 1/1983 | Japan . |
| 989007 | 10/1989 | Japan . |

OTHER PUBLICATIONS

IBM Technical Disclosure Bulletin vol. 17 No. 6 Nov. 1974 pp. 1781-1783.
Japanese patent application No. 25-8969/89, filed Oct. 5, 1989, to M. Kisaka et al., entitled Head Control Apparatus.

Primary Examiner—Aristotelis M. Psitos
Assistant Examiner—Varsha V. Sheladia
Attorney, Agent, or Firm—Joan Pennington; Richard E. Billion; Bradley A. Forrest

[57] ABSTRACT

A transducer head skew arrangement used in a multiple disk drive data storage system is provided. The disk drive unit includes a plurality of magnetic disk surfaces mounted for simultaneous rotation about an axis. A first sequence of servo information tracks are arrayed on a dedicated servo disk surface. At least one servo reference track is written on each data disk surface for storing servo reference information. The servo reference track is written on a first data disk surface aligned with a predefined servo information track on the dedicated servo disk surface. Then servo reference tracks are sequentially written on each successive consecutive data disk surface progressively offset radially from the last written servo reference track. A plurality of data information tracks for storing data are disposed at predetermined positions relative to the servo reference track on each the data disk surface. A servo transducer head is mounted for movement in a radial direction across the first dedicated servo information for reading servo information; and a plurality of data transducer heads are mounted for movement with the servo transducer head in a radial direction across the disk surfaces for reading the servo reference tracks and for reading and/or writing data to the data information tracks. The distance moved by transducer heads for a cylinder switch is the same distance moved for each head switch, so that track-to-track seek time is minimized without requiring any additional time delay for each head switch. An overall data transfer rate increases for every data transfer accessing more than one data cylinder.

16 Claims, 2 Drawing Sheets

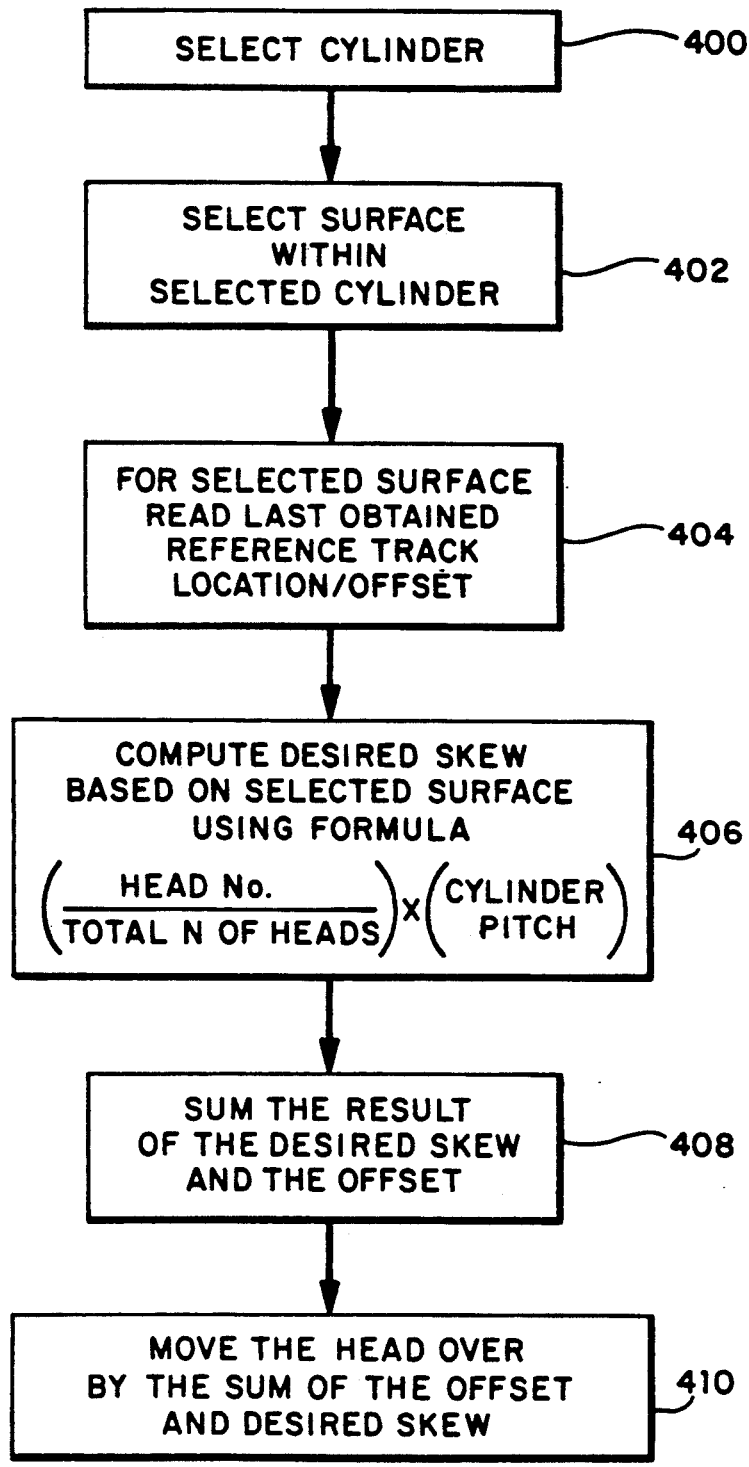

TRANSDUCER HEAD SKEW ARRANGEMENT FOR DISK DRIVE SYSTEM

BACKGROUND OF THE INVENTION

1. Field of the Invention

The present invention relates generally to a track following servo arrangement for a disk drive unit, and more particularly to a transducer head skew arrangement used in a rigid multiple disk drive data storage system for improving track-to-track seek times.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Transducer heads driven in a path toward and away from the drive axis write data to the disks and read data from the disks. The data is recorded in concentric, radially spaced data information tracks arrayed on the surfaces of the disks.

Data located on a particular track on a disk surface is read or written by properly positioning a data transducer head directly over the track. In order to maintain the head in proper position over the data track, track following servo systems often are incorporated into disk drives. Servo position control is used to position the data heads in registration with the data information tracks. One servo system uses a dedicated transducer head to read position signals recorded in servo information tracks on a dedicated disk surface. The data heads are ganged with the servo head for simultaneous movement relative to the data information tracks and the servo information tracks. To access the disk drive unit, a feedback controlled drive system locates the servo head in a desired position, thereby to locate a data head in registration with a specific data information track where data is to be written or read.

For example, U.S. Pat. No. 3,838,457 discloses a track following system detecting special servo signals written on a dedicated servo disk surface by a dedicated servo transducer head. The disclosed system distinguishes one track from another within a repeating group of tracks. A biasing signal is added to the detected signal when the transducing head is located more than one-half track from the target track. A position error signal is produced having a linear slope over the group number of tracks for enabling electrically offsetting of the transducing head up to one-half the group number of tracks by modifying the position error signal.

U.S. Pat. No. 4,807,063 discloses a head position control system for a disk storage unit using a data-surface-servo system with reference information written only into one portion of each track of data in the circumferential direction. The reference information storage regions are arranged on each major surface of each disk with an angular spacing of 360°/4N (where N is the number of disks). The reference information storage regions for the respective disks are equiangularly displaced from each other, so that the reference information is read out from the angularly displaced reference information storage regions during each rotation of the disk to detect a displacement of the head from its normal or proper position every time the reference information is read out, and the displacement of the head is corrected in accordance with the detected displacement.

U.S. Pat. No. 4,809,120 discloses a head position control system using reference information regions on the disk surfaces mutually displaced for respective disks. During rotation of the disks, reference information is read out from the regions mutually displaced on the surfaces of the multiple disks. A deviation of each head from a normal or proper head position in relation to a specific track is detected so that in response to the detected deviation, a position of each head is corrected.

Japanese patent No. 58-1812 discloses an initializing system for a mobile head type magnetic device to eliminate the waiting time when a data process jumps over a cylinder, by setting the head record of the contiguous cylinder at a position angularly shifted, or jumped, by an extent equivalent to the seek time of the magnetic head.

Japanese patent application No. 25-8969/89 filed Oct. 5, 1989 discloses a disk apparatus having q heads and q disk surfaces where q is not less than 2. The disk surfaces include the same number of sectors and each disk surface includes a servo sector. Servo information for head positioning is recorded in each servo sector. Servo information is successively read out from the q disk surfaces. Successive q servo informations are averaged to control a position or a speed of the head for the disk surface from which the last servo information is read out.

For any servo control arrangement to be used in a disk drive unit, it is important to minimize the time required to move the data head transducer from a present track to a specified track position. Often the track-to-track seek time or the time needed to move from one track to an adjacent track is the most important factor in the overall file data transfer rate.

SUMMARY OF THE INVENTION

A principal object of the present invention is to provide an improved transducer head skew arrangement for a rigid multiple disk drive data storage system to improve track-to-track seek times. Other objects are to provide such an improved transducer head skew arrangement substantially without negative effects and that overcomes many of the disadvantages of prior art arrangements.

In brief, the objects and advantages of the present invention are achieved by a transducer head skew arrangement used in a multiple disk drive data storage system. The disk drive unit includes a plurality of magnetic disk surfaces mounted for simultaneous rotation about an axis. A first sequence of servo information tracks are arrayed on the dedicated servo disk surface. At least one servo reference track is written on each data disk surface for storing servo reference information. The servo reference track is written on a first data disk surface aligned with the servo information tracks on the dedicated servo disk surface. Then servo reference tracks are sequentially written on each successive consecutive data disk surface progressively offset radially from the last written servo reference tracks. A plurality of data information tracks for storing data are disposed at predetermined positions relative to the servo reference track on each the data disk surface. A servo transducer head is mounted for movement in a radial direction across the first dedicated servo disk surface for reading servo information; and a plurality of data transducer heads are mounted for movement with the servo transducer head in a radial direction across the disk surfaces for reading the servo reference tracks and for reading and/or writing data to the data information tracks.

In accordance with the invention, the distance moved by the transducer heads for a cylinder switch is the same distance moved for each head switch, so that track-to-track seek time is minimized and an overall data transfer rate increases for every data transfer using more than one data cylinder.

BRIEF DESCRIPTION OF THE DRAWINGS

The present invention together with the above and other objects and advantages may best be understood from the following detailed description of the embodiment of the invention illustrated in the drawings, wherein:

FIG. 4 is a flow chart illustrating alternative logical steps performed by a servo processor for head positioning relative to consecutive logical data tracks of multiple data disks of the disk drive unit embodying the present invention.

DETAILED DESCRIPTION OF THE PREFERRED EMBODIMENTS

Figure 1:
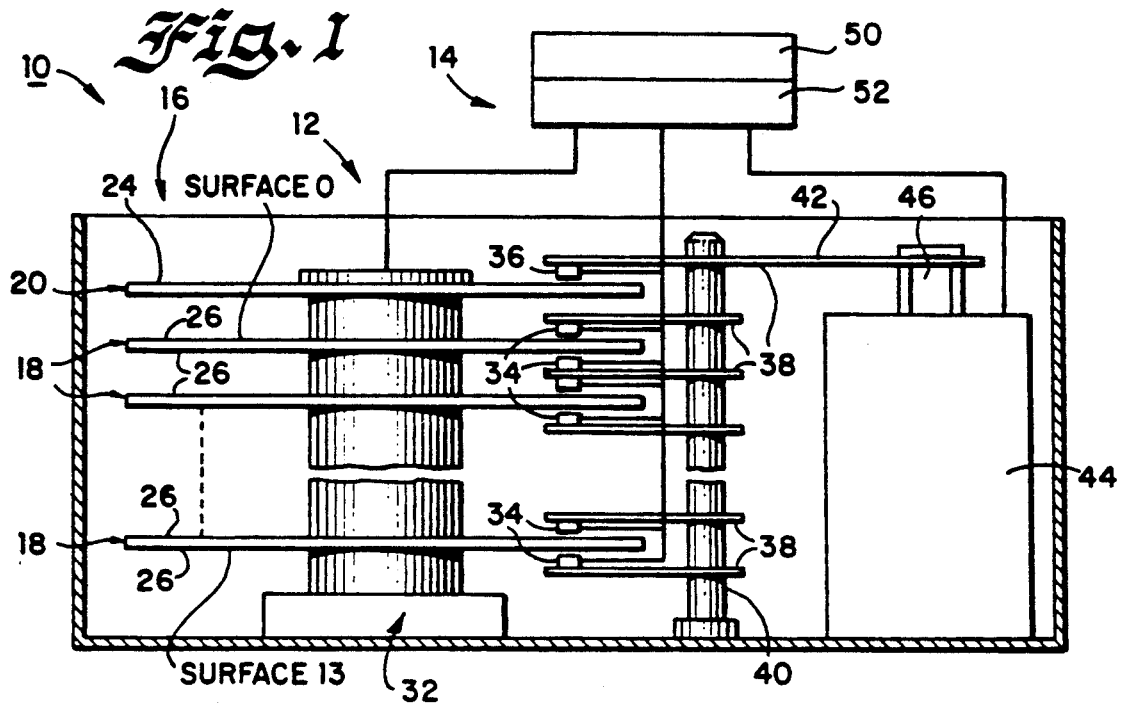
FIG. 1 is a schematic and block diagram of a computer or data processing system having a data storage disk drive unit embodying the present invention.

In FIG. 1 there is shown a partly schematic block diagram of parts of a computer data processing system 10 including a data storage medium generally designated as 12 and a data utilizing device generally designated as 14. In the preferred embodiment of this invention, the data storage medium 12 is embodied in a rigid magnetic disk drive unit 12, although other memory configurations may be used. Unit 12 is illustrated in simplified form sufficient for an understanding of the present invention because the utility of the present invention is not limited to the details of a particular drive unit construction.

Figure 2:
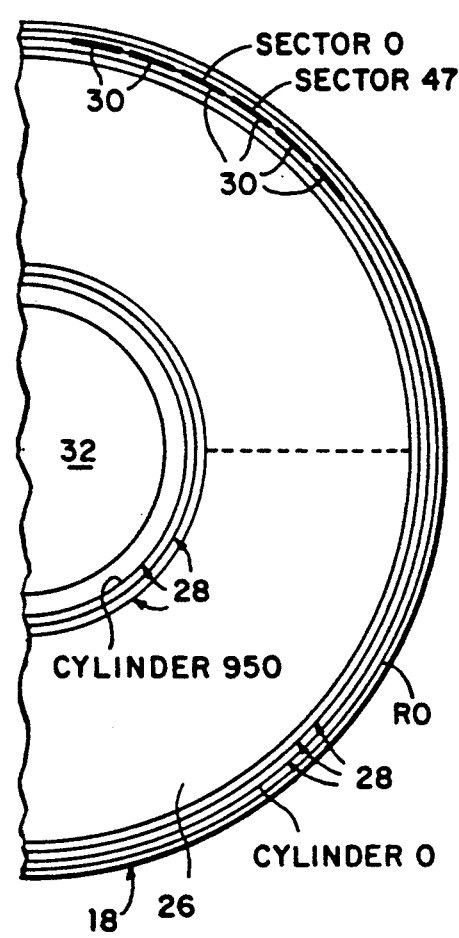
FIG. 2 illustrates tracks and sectors of a data storage disk of the system of FIG. 1.

Referring now to FIGS. 1 and 2 of the drawings, disk drive unit 12 includes a stack 16 of disks 18 and 20 having magnetic surfaces. Disk 20 includes a pattern of concentric servo information tracks 22 (FIG. 3) written in the magnetic medium over a dedicated servo information surface 24 of the disk 20. Data disks 18 include a layer of magnetic material on opposed disk surfaces 26. Unit 12 includes a selected number of the double-sided data disks 18 to provide a selected storage capacity, for example, such as 14 data surfaces, as indicated in FIG. 1 numbered from SURFACE 0 through SURFACE 13. Numerous data information tracks or cylinders 28 are arrayed in a concentric pattern in the magnetic medium of each disk surface 26 of data disks 18. The data information tracks 28 are disposed at predetermined positions relative to servo reference tracks R0-R13 illustrated and described with respect to FIG. 3. A data cylinder includes a set of corresponding data information tracks 28 for the data SURFACES 1-N. For example, 951 data cylinders can be included in the disk surfaces 26 numbered from 0-950 as indicated in FIG. 2. Each data information track 28 includes multiple data sectors 30 equally spaced around the cylinder; for example, 48 data sectors numbered 0-47. The illustrated disk drive unit 12 provides a total of 639,072 data sectors 30 (14 data surfaces×48 data sectors/track×951 data tracks) each assigned a number or logical block address (LBA).

Sequential data sector numbers or LBA's are assigned, for example, with the data sector number 1 defining the first data sector 0 on data SURFACE 0, cylinder 0; the data sector number 48 defining the first data sector 0 on data SURFACE 1, cylinder 0; and the data sector number 639,072 defining the last data sector 47 on data SURFACE 13, cylinder 950. Typically a data file is written and/or read using consecutive LBA's, track following on the data information tracks 28 of successive consecutive logical data SURFACES 0-13 from the starting LBA.

The disks 18 and 20 are mounted in parallel for simultaneous rotation on and by an integrated spindle and motor assembly 32. The data information tracks 28 on each disk 18 are read and/or written to by a corresponding data transducer head 34 movable across the disk surface. A dedicated servo transducer head 36 is used only to read position information provided by the servo information tracks 22 recorded in the dedicated servo information surface 24.

Transducer heads 34 and 36 are carried by arms 38 ganged together for simultaneous pivotal movement about a support spindle 40. One of the arms 38 includes an extension 42 driven in a pivotal motion by a head drive motor 44. Although several drive arrangements are commonly used, the motor 44 can include a coil 46 cooperating with a magnet and core assembly (not seen) operatively controlled for moving the transducer heads 34 and 36 in synchronism in a radial direction in order to position the heads in exact registration with the cylinders 28 to be followed.

Data utilization device 14 typically includes an interface processor 50 that controls transfer of data to be stored in the data sectors 30 of disks 18 for subsequent access and use. A servo processor 52 is coupled between the interface processor 50, the motors 32 and 44 and the data and servo transducer heads 34 and 36. The servo processor 52 controls the operations of moving the heads 34 and 36 into registration with a target or selected data LBA and of transferring data under the control of the interface processor 50.

Disk access can be generally provided in a conventional manner by the servo processor 52. Motor 32 is operated to rotate the disk stack 16. The servo processor 52 employs known servo control principles to move the data heads 34 radially with respect to the rotating disks 18 by the head drive motor 44 to selectively align the data transducer heads with a specific radial position of the cylinder 28 where data is to be read or written.

The data information tracks 28 may move around relative to the servo information tracks 22, causing the centerlines of data information tracks 28 to be shifted relative to the centerline of the servo information tracks 22. Conventional position error correction is provided periodically to identify this misalignment that otherwise can cause soft and hard data errors. Utilizing servo information written in the servo tracks 22 on the dedicated servo surface 24 and servo reference information written on the data surfaces 26 by the servo processor 52 for feedback error-correction controlled energization of the motor 44.

Figure 3:
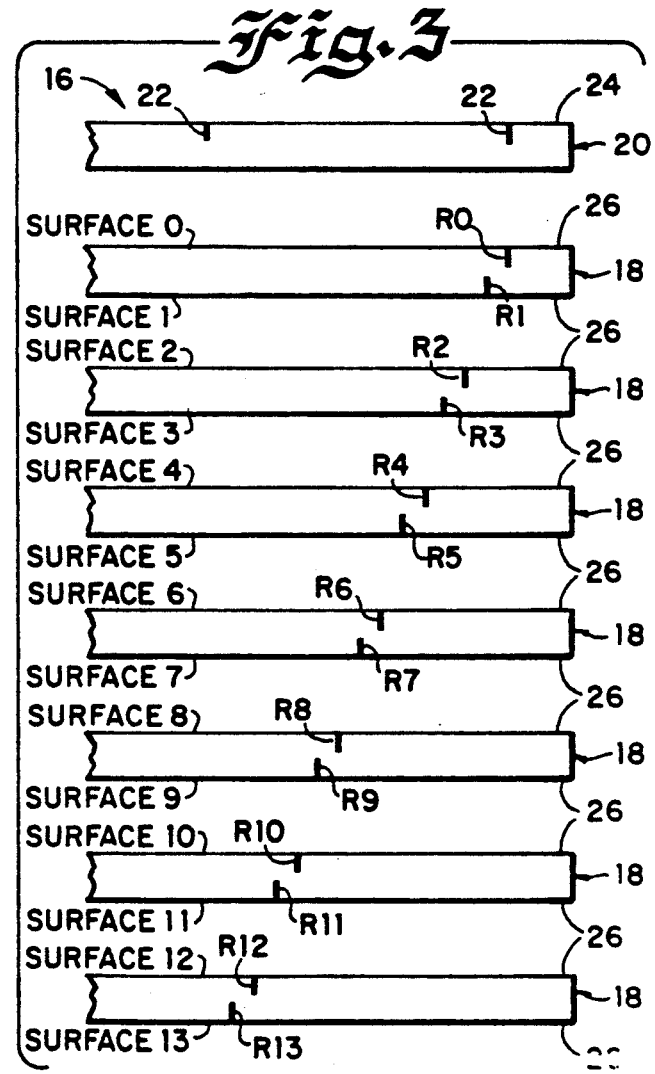
FIG. 3 is an enlarged diagram illustrating relationships between reference servo tracks on a dedicated servo surface and servo reference track for each successive, consecutive logical data surface of multiple data disks of the disk drive unit embodying the present invention.

FIG. 3 is an enlarged diagram illustrating relationships of the present invention between the servo reference tracks 22 and servo reference tracks generally designated R0-R13 written on corresponding data SURFACES 0-13. In accordance with the invention, the reference servo information R0-R13 is written on the data disks with a sequential progressively larger offset relative to the servo surface reference track 22 toward the next logical cylinder, rather than the conventional arrangement of aligning each data reference servo track with the servo reference tracks of the dedicated servo surface. During a formatting operation or incident to the manufacture of the disk drive unit 10, each of the cylinders 28 of the data disks 18 is provided with the reference servo information track R0-R13 written in a predetermined position to each data track 28.

In the illustrated embodiment of the invention, SURFACE 0 reference track R0 is aligned with the servo tracks 22 of the dedicated servo surface 24. Each successive, consecutive logical reference track R1-R13 is shifted or skewed by a selected fraction of a cylinder relative to the prior reference track toward the next consecutive logical cylinder. In the preferred embodiment, the selected skew fraction is 1/N where N is the number of data surfaces. For example, with the illustrated 14 data SURFACES 0-13, reference track R0 is aligned with a centerline of servo track 22, reference track R1 is skewed 1/14 of a cylinder from R0, reference track R2 is skewed 1/14 of a cylinder from R1 and reference track R13 is skewed 13/14 of a cylinder from R0.

For a read or write operation, track following on the data information tracks 28 is used to access sequential LBA's from the particular consecutive logical data SURFACES 0-13 in the selected cylinder 28. The track following process begins with a particular one of the data information tracks 28 for the selected cylinder 28 on the data SURFACE corresponding to a selected or target LBA and continues with corresponding consecutive logical data information tracks 28 for the consecutively larger LBA's until all the data has been read or written. After the last sector of the data information track 28 on the particular data SURFACE is read or written, a head switch is performed to read or write data on the next logical data SURFACE 1-13, starting at sector 0 on the selected cylinder 28. For each head switch, the transducer heads 34 and 36 are moved a radial distance corresponding to the 1/N fraction of a cylinder between sequential ones of the data information tracks 28 in the cylinder.

To accommodate a required head switch time delay when a new head is selected, the data file is written with the first sector on the next data SURFACE angularly shifted or skewed by a selected number of sectors relative to the current sector of data SURFACE being read. In known servo control systems where radial movement of the transducer heads is not required for a head switch because the servo reference tracks are aligned, a two sector shift conventionally is provided from the last sector 47 of the current data SURFACE to the first sector 0 of the next data SURFACE. The conventional two sector shift provides sufficient delay for each head switch performed using the skew arrangement of the reference tracks R0-R13 of the invention that includes radial movement of the transducer heads 34 and 36.

When the last sector 47 on the current particular cylinder on data SURFACE 13 is read, then a cylinder seek to the next higher cylinder and a head switch to SURFACE 0 are performed. Transducer head 34 is track following data information track 28 when reading the last sector on data SURFACE 13. Transducer heads 34 and 36 are moved the radial distance corresponding to the 1/N fraction of a cylinder for track following on the next data information track 28 on the next higher cylinder on data SURFACE 0.

Conventionally, when the cylinder seek is performed, a longer time delay is required than for a head switch because the transducer heads must be moved a complete cylinder distance. To accommodate the longer track-to-track seek time, the data file is written with the first sector on data SURFACE 0 shifted or skewed by a much larger number of sectors relative to the last sector 47 on data SURFACE 13. For example, conventionally a twenty sector shift has been provided from the last sector 47 on SURFACE 13 to the first sector 0 on SURFACE 0.

Using the skew arrangement of the reference tracks R0-R13 on consecutive data SURFACES 0-13 enables using the same two sector shift from the last sector 47 on SURFACE 13 to the first sector 0 on SURFACE 0. The required distance moved by transducer heads 34 and 36 for a cylinder switch is the same distance for each head switch. With the reduced track-to-track seek time, the overall data transfer rate significantly increases for every data transfer that crosses a cylinder boundary.

Referring to FIG. 4, there is shown a flow chart illustrating sequential operations performed by the servo processor 52 for positioning the transducer head 34 and 36 in accordance with an alternative arrangement of the invention. In the alternative arrangement, each of the reference tracks R0-R13 are aligned with the servo information tracks 22 when written on each of the N data surfaces 26. The sequential operations begin with the servo processor 52 identifying a selected cylinder as indicated at a block 400 and identifying a selected data SURFACE within the selected cylinder as indicated at a block 402. Then for the selected surface, a last obtained reference track location is read as indicated at a block 404. The last obtained reference track location is stored in memory of the servo processor 52 in terms of an offset from the servo track 22 on the dedicated servo surface 24 for the selected cylinder.

Next a desired skew is calculated for the particular selected data SURFACE by dividing the SURFACE or head number for the particular data SURFACE 0-13 by the total number N of data SURFACES and multiplying by the cylinder pitch as indicated at a block 406. Then the desired skew calculated at block 406 is summed with the offset identified at block 404 as indicated at a block 408. Then the transducer head 34 associated with the particular data SURFACE is moved over by the sum of the offset and the desired skew as indicated at a block 410. The transducer heads 34 and 36 are moved by the desired skew (1/N of a cylinder) for each head switch and for a cylinder switch.

It should be understood that the principles of the present invention are not limited to the illustrated arrangement utilizing dedicated servo information tracks and data surface reference tracks. In buried sector servo or imbedded servo arrangements where servo signals are interspersed with data on or beneath the data track itself, sequentially offsetting of consecutive logical data information tracks advantageously can be provided, as taught by the invention.

While the invention has been described with reference to details of the illustrated embodiments, these details are not intended to limit the scope of the invention as defined in the appended claims.

We claim:

1. A disk drive data storage system comprising:
   a plurality of disk surfaces mounted in parallel for simultaneous rotation about an axis;
   a plurality of data information tracks on each disk surface for storing data; corresponding consecutive ones of said plurality of data information tracks on successive consecutive data disk surfaces defining a plurality of consecutive logical data cylinders;
   at least one servo reference track on each disk surface for storing servo reference information; on each successive consecutive data disk surface said servo reference track being offset in a radial direction relative to a reference track on a prior data disk surface toward a next consecutive logical data cylinder;
   said data information tracks disposed at predetermined positions relative to said at least one servo reference track on each said disk surface; sequential ones of said data information tracks in each cylinder being progressively offset in a radial direction toward a next consecutive logical data cylinder; and
   a plurality of data transducer heads mounted for movement in a radial direction across said disk surfaces for reading said servo reference tracks and for reading and/or writing data to said data information tracks.

2. A disk drive data storage system as recited in claim 1 wherein said servo reference tracks between consecutive data disk surfaces are radially separated by a fraction 1/N of the distance between adjacent data information tracks, where N equals the number of data disk surfaces.

3. A disk drive data storage system as recited in claim 1 further comprising a plurality of servo information tracks arrayed on a first dedicated servo information disk surface; a servo transducer head mounted for movement with said data transducer heads in a radial direction across said first dedicated servo information for reading servo information; and wherein said at least one servo reference track on a first one of the data disk surfaces is aligned with a predefined servo information track on said first dedicated servo information disk surface.

4. A disk drive data storage system as recited in claim 3 wherein said at least one servo reference track on a second consecutive data disk surface is radially offset from said servo reference track on said first disk surface by a predetermined part of a cylinder distance.

5. A disk drive data storage system as recited in claim 1 where n the radial offset between successive consecutive data disk surfaces is uniform.

6. A disk drive data storage system as recited in claim 2 wherein each said data information track includes a plurality of data sectors equally spaced angularly about said data information track and said plurality of data sectors having consecutive logical address numbers.

7. A disk drive data storage system as recited in claim 6 wherein said transducer heads are moved in a radial direction by said fractional 1/N distance for a head switch to a next consecutive data disk surface.

8. A disk drive data storage system as recited in claim 7 wherein said transducer heads are moved in a radial direction by said fractional 1/N distance to access a next consecutive data information track on a next consecutive cylinder.

9. A disk drive data storage system as recited in claim 8 wherein a first data sector on said next consecutive data disk surface is shifted by a predetermined number of data sectors for both said head switch and to access said next consecutive cylinder.

10. A disk drive data storage system as recited in claim 9 wherein said predetermined number of data sectors is two.

11. A method for positioning data transducer heads in a disk drive unit including a sequence of servo information tracks arrayed on a dedicated servo information disk surface, a plurality of data disk surfaces, (N), each including a plurality of data information tracks for storing data and at least one servo reference track, the disk surfaces being mounted in parallel for simultaneous rotation about an axis, a corresponding data transducer head for reading and/or writing data to said data disk surfaces, a servo transducer head for reading the servo information tracks from the dedicated servo information disk surface and the servo and data transducer heads being mounted for movement in a radial direction across the disk surfaces, said method comprising the steps of:
   writing a first servo reference track on a first data disk surface aligned with a predefined servo information track on the dedicated servo information disk surface;
   sequentially writing a servo reference track on each successive consecutive data disk surface radially offset toward a next servo reference track on the dedicated servo information disk surface from the last written servo reference track, said radial offset equal to a fraction 1/N of the distance between adjacent servo information tracks on the dedicated servo information disk surface; and
   utilizing said written radially offset servo reference tracks for moving said transducer heads in a radial direction equal to 1/N distance for each head switch to access a next consecutive data disk surface.

12. A method as recited in claim 11 further includes the step of:
   moving the transducer heads in a radial direction by said fractional 1/N distance to access a next consecutive data cylinder on a next consecutive data disk surface.

13. A method as recited in claim 12 further includes the step of:
   angularly shifting a first sector position on a next consecutive data disk surface by a predetermined number of sectors from a last sector position on the last data disk surface for both said head switch and to access said next consecutive data cylinder.

14. A method of accessing consecutive logical sectors for use in a disk drive unit including a plurality of data disk surfaces rotatably driven about an axis, a plurality of data information tracks arrayed on each said data disk surface defining multiple data sectors; corresponding consecutive ones of said plurality of data information tracks on successive consecutive data disk surfaces defining a plurality of consecutive logical data cylinders; sequential ones of said data information tracks in each cylinder being progressively offset in a radial direction toward a next consecutive logical data cylinder; and a corresponding data transducer head controllably moved in a radial direction across each said data disk surface, said method comprising the steps of:

moving the data transducer head to a target logical sector on a selected data surface and a selected cylinder;

following the target data information track until a last consecutive logical sector is accessed in the target data information track;

moving the transducer heads in a radial direction by a predetermined offset to access a next consecutive data information track on a next consecutive data disk surface and angularly shifting a first sector position on a next consecutive data disk surface by a predetermined number of sectors from a last sector position on the current data disk surface;

following said accessed data information track until a last consecutive logical sector is accessed;

repeating said transducer head moving and following steps for each consecutive logical data disk surface of the selected cylinder; and moving the transducer heads in a radial direction by said predetermined offset to access a next consecutive data cylinder on a first data disk surface and angularly shifting a first sector position on said first data disk surface by said predetermined number of sectors.

15. A method for positioning data transducer heads in a disk drive unit including a sequence of servo information tracks arrayed on a dedicated servo information disk surface, a plurality of data disk surfaces (N) each including a plurality of data information tracks for storing data and at least one servo reference track aligned with a predefined servo information tracks, each data information track including a plurality of data sectors spaced equiangularly around the data information track corresponding consecutive ones of said plurality of data information tracks on successive consecutive data disk surfaces defining a plurality of consecutive logical data cylinders; sequential ones of said data information tracks in each cylinder being progressively offset toward a next consecutive logical data cylinder; the disk surfaces being mounted in parallel for simultaneous rotation about an axis, a corresponding data transducer head for reading and/or writing data to said data disk surfaces, a servo transducer head for reading the servo information tracks from the dedicated servo information disk surface and the servo and data transducer heads being mounted for movement in a radial direction across the disk surfaces, said method comprising the steps of:

identifying a selected cylinder and a selected surface with the selected cylinder for a target logical sector;

reading a reference track location value for the selected surface;

calculating a predefined offset for the identified selected surface;

summing the read value and the calculated offset; and moving the corresponding data transducer head by the sum of the read value and the calculated offset.

16. A disk drive data storage system comprising:

a plurality of disk surfaces (N) for storing data and for storing servo reference information, said disk surfaces mounted in parallel for simultaneous rotation about an axis;

a plurality of data information tracks on each disk surface for storing data, corresponding consecutive ones of said plurality of data information tracks on sequential data disk surfaces on successive consecutive data disk surfaces (N) defining a plurality of consecutive logical data cylinders; sequential ones of said data information tracks on each cylinder being progressively offset in a radial direction toward a next consecutive logical data cylinder; a radial offset between sequential data information tracks being equal to a fraction 1/N of a cylinder pitch; and a plurality of data transducer heads mounted for movement in a radial direction across said disk surfaces for reading said servo reference information and for reading and/or writing data to said data information tracks.

\* \* \* \* \*

UNITED STATES PATENT AND TRADEMARK OFFICE
CERTIFICATE OF CORRECTION

PATENT NO. : 5,193,036
DATED : March 9, 1993
INVENTOR(S) : Green et al.

It is certified that error appears in the above-identified patent and that said Letters Patent is hereby corrected as shown below:

Column 7, line 60, replace "where n" with --wherein--.

Column 9, line 37, replace "tracks" with --track--.

Column 9, line 39, "track" should be followed by a --,--.

Column 10, line 30, delete "sequential data disk surfaces on".

Column 10, line 33, after "on", insert --sequential data disk surfaces--.

Signed and Sealed this

Twenty-third Day of November, 1993

Attest:

BRUCE LEHMAN

Attesting Officer        Commissioner of Patents and Trademarks